United States Patent
Tsao et al.

(10) Patent No.: US 10,169,581 B2
(45) Date of Patent: Jan. 1, 2019

(54) DETECTING MALICIOUS CODE IN SECTIONS OF COMPUTER FILES

(71) Applicant: Trend Micro Incorporated, Tokyo (JP)

(72) Inventors: Wen-Kwang Tsao, Shin-I (TW); PingHuan Wu, Taipei (TW); Wei-Zhi Liu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 243 days.

(21) Appl. No.: 15/249,702

(22) Filed: Aug. 29, 2016

(65) Prior Publication Data

US 2018/0060576 A1    Mar. 1, 2018

(51) Int. Cl.
*G06F 21/56* (2013.01)
*G06N 99/00* (2010.01)

(52) U.S. Cl.
CPC ............ *G06F 21/56* (2013.01); *G06F 21/562* (2013.01); *G06N 99/005* (2013.01); *G06F 2221/034* (2013.01)

(58) Field of Classification Search
CPC .............................. G06F 21/56–21/565; G06F 2221/033–2221/034; G06N 99/005
See application file for complete search history.

(56) References Cited

U.S. PATENT DOCUMENTS

| | | |
|---|---|---|
| 5,442,699 A | 8/1995 | Arnold et al. |
| 5,452,442 A | 9/1995 | Kephart |
| 5,640,492 A | 6/1997 | Cortes et al. |
| 5,649,068 A | 7/1997 | Boser et al. |
| 5,907,834 A | 5/1999 | Kephart et al. |
| 6,161,130 A | 12/2000 | Horvitz et al. |
| 6,192,512 B1 | 2/2001 | Chess |
| 6,279,128 B1 | 8/2001 | Arnold et al. |
| 6,622,134 B1 | 9/2003 | Sorkin |
| 6,650,890 B1 | 11/2003 | Irlam et al. |

(Continued)

FOREIGN PATENT DOCUMENTS

| | | |
|---|---|---|
| EP | 1 377 892 B1 | 9/2004 |
| WO | WO 02084429 A1 | 10/2002 |

OTHER PUBLICATIONS

MAMA: Scripting—quantities and sizes—Dev.Opera, Dec. 12, 2008, 1 sheet [retrieved on Apr. 22, 2011], retrieved from the internet: http://dev.opera.com/articles/view/mama-scripting-quantities-and-sizes/.

(Continued)

*Primary Examiner* — Minh Dinh
(74) *Attorney, Agent, or Firm* — Okamoto & Benedicto LLP

(57) ABSTRACT

A training data set for training a machine learning module is prepared by dividing normal files and malicious files into sections. Each section of a normal file is labeled as normal. Each section of a malicious file is labeled as malicious regardless of whether or not the section is malicious. The sections of the normal files and malicious files are used to train the machine learning module. The trained machine learning module is packaged as a machine learning model, which is provided to an endpoint computer. In the endpoint computer, an unknown file is divided into sections, which are input to the machine learning model to identify a malicious section of the unknown file, if any is present in the unknown file.

17 Claims, 5 Drawing Sheets

(56) References Cited

U.S. PATENT DOCUMENTS

| | | | |
|---|---|---|---|
| 6,711,583 B2 | 3/2004 | Chess et al. | |
| 6,732,157 B1 | 5/2004 | Gordon et al. | |
| 6,778,941 B1 | 8/2004 | Worrell et al. | |
| 6,789,200 B1 | 9/2004 | Fiveash et al. | |
| 6,813,712 B1 | 11/2004 | Luke | |
| 7,076,527 B2 | 7/2006 | Bellegarda et al. | |
| 7,089,429 B2 | 8/2006 | Gustafsson | |
| 7,426,510 B1 | 9/2008 | Libenzi et al. | |
| 7,756,535 B1 | 7/2010 | Diao et al. | |
| 8,370,938 B1 | 2/2013 | Daswani et al. | |
| 8,402,543 B1 | 3/2013 | Ranjan et al. | |
| 8,621,625 B1* | 12/2013 | Bogorad | G06F 21/562 370/229 |
| 8,667,591 B1* | 3/2014 | Claudatos | G06F 21/564 726/24 |
| 8,838,992 B1 | 9/2014 | Zhu et al. | |
| 2004/0143713 A1* | 7/2004 | Niles | G06F 11/1453 711/162 |
| 2006/0075494 A1 | 4/2006 | Bertman et al. | |
| 2006/0122957 A1 | 6/2006 | Chen | |
| 2006/0123244 A1* | 6/2006 | Gheorghescu | G06F 21/563 713/188 |
| 2006/0259543 A1 | 11/2006 | Tindall | |
| 2007/0233463 A1 | 10/2007 | Sparre | |
| 2007/0266436 A1* | 11/2007 | Ballard | G06F 21/562 726/24 |
| 2010/0195909 A1 | 8/2010 | Wasson et al. | |
| 2011/0040825 A1 | 2/2011 | Ramzan et al. | |
| 2012/0084859 A1 | 4/2012 | Randinsky et al. | |
| 2017/0193230 A1* | 7/2017 | Jevnisek | G06F 21/565 |

OTHER PUBLICATIONS

InfoGainAttributeEval—Pentaho Data Mining—Pentaho Wiki, 1 sheet [retrieved on Apr. 22, 2011], retrieved from the internet: http://wiki.pentaho.com/display/DATAMINING/InfoGainAttributeEval.

Lex (software)—Wikipedia, the free encyclopedia, 1 sheet [retrieved on Apr. 22, 2011], retrieved from the internet: http://en.wikipedia.org/wiki/Lex_(software).

Weka:W-InfoGainAttributeEval—Rapid-I-Wiki, 2 sheets [retrieved on Apr. 22, 2011], retrieved from the internet: http://rapid-i.com/wiki/index.php?title=Weka:W-InfoGainAttributeEval.

Tf-idf—Wikipedia, the free encyclopedia, 4 sheets [retrieved on Apr. 22, 2011], retrieved from the internet: http://en.wikipedia.org/wiki/Tf%E2%80%93idf.

Support vector machine—Wikipedia, the free encyclopedia, 11 sheets [retrieved on Apr. 22, 2011], retrieved from the internet: http://en.wikipedia.org/wiki/Support_vector_machine.

\* cited by examiner

PARTIAL SECTION OF CODE FROM MALICIOUS FILE

```
         00 01 02 03 04 05 06 07 08 09 0A 0B 0C 0D 0E 0F  0123456789ABCDEF
000000   CA FE BA BE 00 00 00 32 00 2C 07 00 02 01 00 09  .......2.,......
000010   54 65 73 74 41 72 72 61 79 07 00 04 01 00 10 6A  TestArray......j
000020   61 76 61 2F 6C 61 6E 67 2F 4F 62 6A 65 63 74 01  ava/lang/Object.
000030   00 06 3C 69 6E 69 74 3E 01 00 03 28 29 56 01 00  ..<init>...()V..
000040   04 43 6F 64 65 0A 00 03 00 09 0C 00 05 00 06 01  .Code...........
000050   00 0F 4C 69 6E 65 4E 75 6D 62 65 72 54 61 62 6C  ..LineNumberTabl
000060   65 01 00 12 4C 6F 63 61 6C 56 61 72 69 61 62 6C  e...LocalVariabl
000070   65 54 61 62 6C 65 01 00 04 74 68 69 73 01 00 0B  eTable...this...
000080   4C 54 65 73 74 41 72 72 61 79 3B 01 00 04 6D 61  LTestArray;...ma
```

FIG. 3

PARTIAL SECTION OF CODE FROM NORMAL FILE

```
         00 01 02 03 04 05 06 07 08 09 0A 0B 0C 0D 0E 0F  0123456789ABCDEF
000000   02 5B 49 09 00 13 00 15 07 00 14 01 00 10 6A 61  .[I...........ja
000010   76 61 2F 6C 61 6E 67 2F 53 79 73 74 65 6D 0C 00  va/lang/System..
000020   16 00 17 01 00 03 6F 75 74 01 00 15 4C 6A 61 76  ......out...Ljav
000030   61 2F 69 6F 2F 50 72 69 6E 74 53 74 72 65 61 6D  a/io/PrintStream
000040   3B 08 00 19 01 00 07 65 6C 65 6D 65 6E 74 0A 00  ;......element..
000050   1B 00 1D 07 00 1C 01 00 13 6A 61 76 61 2F 69 6F  .........java/io
000060   2F 50 72 69 6E 74 53 74 72 65 61 6D 0C 00 1E 00  /PrintStream....
000070   65 54 61 62 6C 65 01 00 04 74 68 69 73 01 00 0B  eTable...this...
000080   4C 54 65 73 74 41 72 72 61 79 3B 01 00 04 6D 61  LTestArray;...ma
```

FIG. 4

DETECTING MALICIOUS CODE IN SECTIONS OF COMPUTER FILES

BACKGROUND OF THE INVENTION

1. Field of the Invention

The present invention relates generally to computer security, and more particularly but not exclusively to methods and systems for evaluating computer files for malicious code.

2. Description of the Background Art

Machine learning technology is commonly used to detect malware. Currently, machine learning for malware detection involves supervised learning to generate a machine learning model. Generally speaking, a training data set of known malicious files and known normal (i.e., benign) files are prepared. A malicious file is labeled as "malicious" and a normal file is labeled as "normal." The training data set is input to a machine learning module, which employs a machine learning algorithm, such as Support Vector Machine (SVM) or Random Forest algorithm. The machine learning module learns from the training data set to make a prediction as to whether or not an unknown file is malicious or normal. A trained machine learning module is packaged as a machine learning model that is provided to a computer system. An unknown file received in the computer system is input to the machine learning model, which classifies the unknown file as either malicious or normal.

Currently available machine learning models are very sophisticated and are able to classify files with a high degree of accuracy. However, while a typical machine learning model can tell if an unknown file is malicious, the machine learning model is not able to identify which section or sections of the file are malicious.

SUMMARY

In one embodiment, a training data set for training a machine learning module is prepared by dividing normal files and malicious files into sections. Each section of a normal file is labeled as normal. Each section of a malicious file is labeled as malicious regardless of whether or not the section is malicious. The sections of the normal files and malicious files are used to train the machine learning module. The trained machine learning module is packaged as a machine learning model, which is provided to an endpoint computer. In the endpoint computer, an unknown file is divided into sections, which are input to the machine learning model to identify a malicious section of the unknown file, if any is present in the unknown file.

These and other features of the present invention will be readily apparent to persons of ordinary skill in the art upon reading the entirety of this disclosure, which includes the accompanying drawings and claims.

DESCRIPTION OF THE DRAWINGS

FIG. 3 shows an example file section of a malicious file.

FIG. 4 shows an example file section of a normal file.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
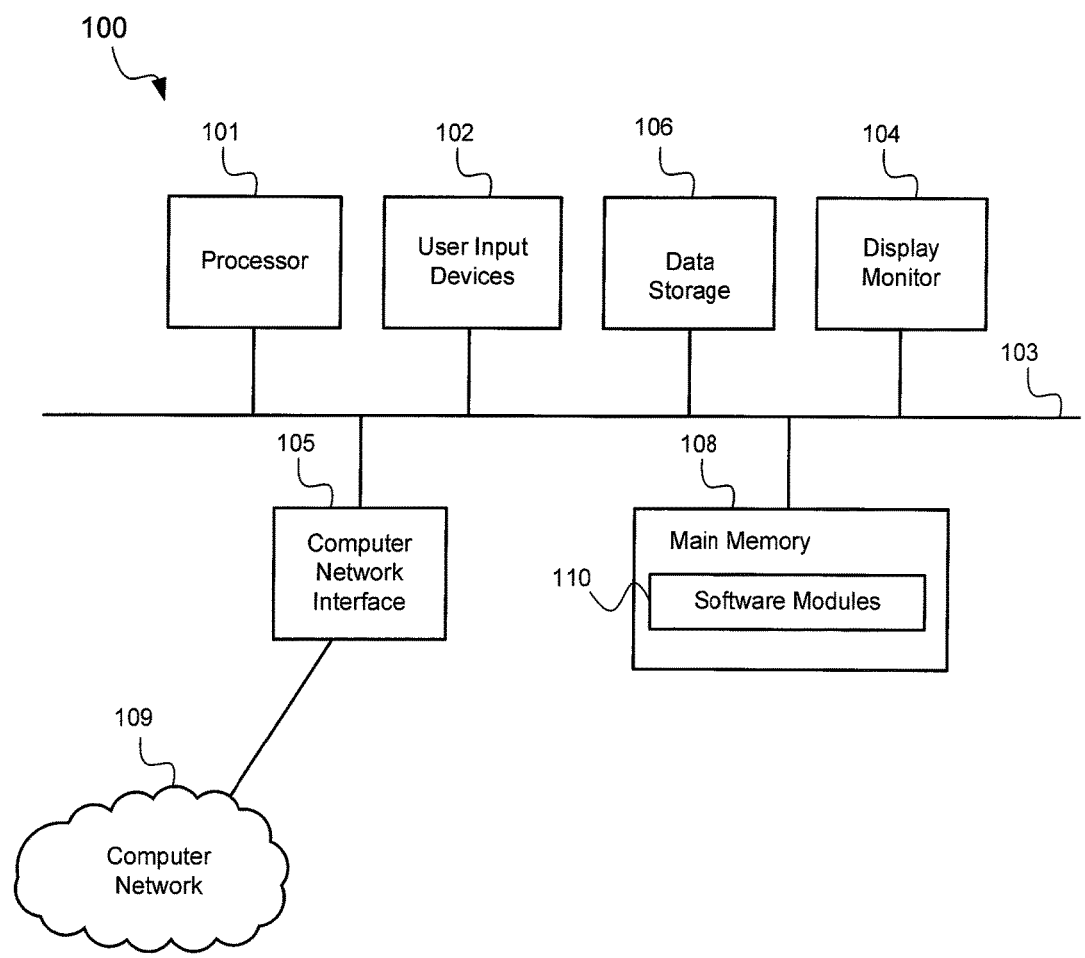
FIG. 1 shows a schematic diagram of a computer system in accordance with an embodiment of the present invention.

Referring now to FIG. 1, there is shown a schematic diagram of a computer system 100 in accordance with an embodiment of the present invention. The computer system 100 may be employed as an endpoint computer system or a backend computer system, for example. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, which comprise instructions stored non-transitory in the main memory 108 for execution by the processor 101 to cause the computer system 100 to perform corresponding programmed steps. An article of manufacture may be embodied as computer-readable storage medium including instructions that when executed by the processor 101 causes the computer system 100 to be operable to perform the functions of the one or more software modules 110. In the example of FIG. 1, the software modules 110 comprise a pre-processor and a machine learning module when the computer system 100 is employed as a backend computer system. The software module 110 may comprise a malware detector with a machine learning model when the computer system 100 is employed as an endpoint computer system.

Figure 2:
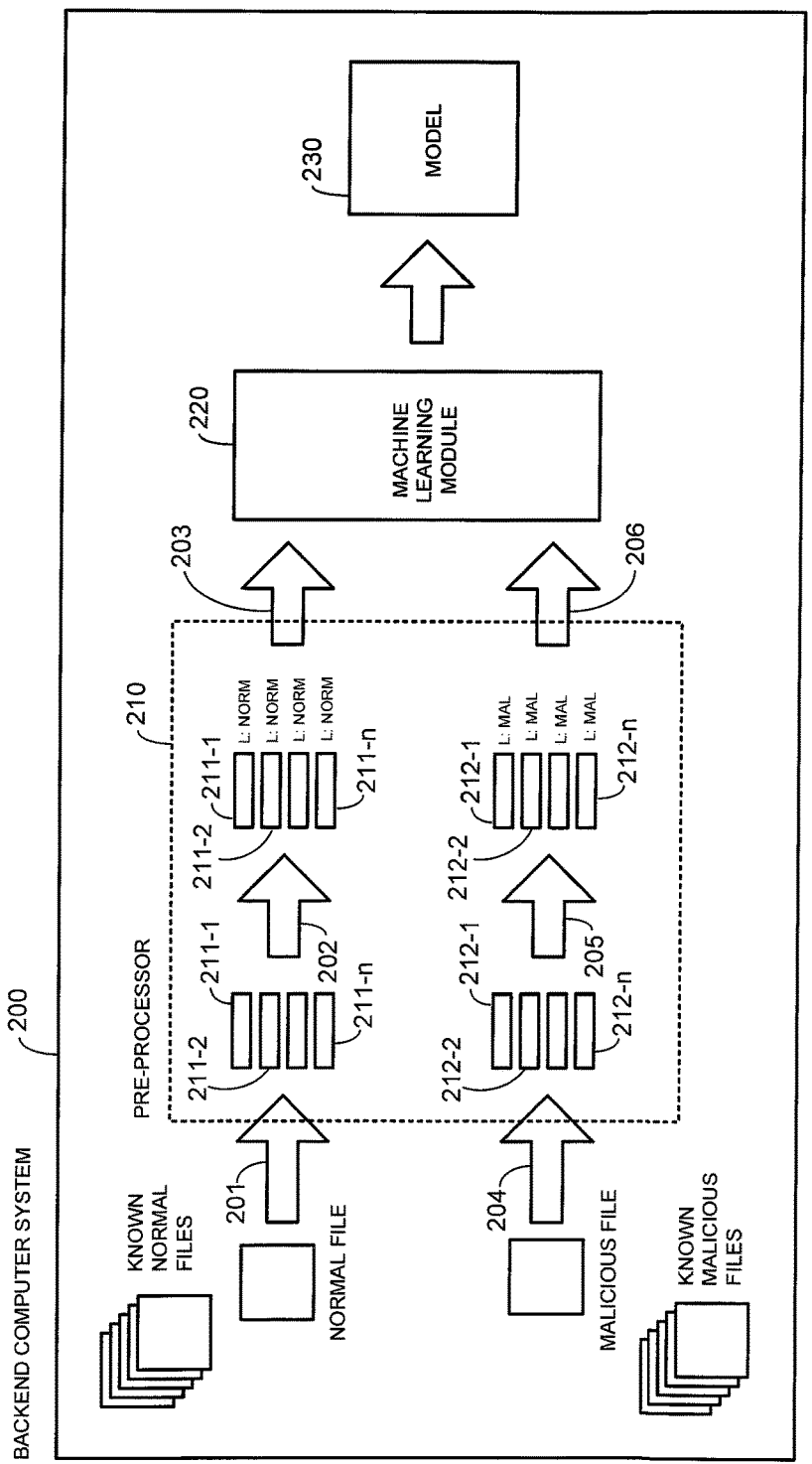
FIG. 2 shows a logical diagram of a backend computer system in accordance with an embodiment of the present invention.

FIG. 2 shows a logical diagram of backend computer system 200 in accordance with an embodiment of the present invention. The backend computer system 200 may comprise one or more computers for generating a machine learning model 230 for identifying malicious files (also referred to as "malware") and which section of a malicious file has malicious code.

In the example of FIG. 2, the backend computer system 200 receives a training data set of samples of known normal files and known malicious files. In one embodiment, the known normal files and known malicious files are executable files, such as files in the Portable Executable (PE) format. The known normal files and known malicious files may be received from trusted customers, honeypots, and antivirus research centers, to name a few examples. The known normal files and known malicious files may be scanned or tested for malware for verification.

The pre-processor 210 may comprise instructions for dividing a file into a plurality of sections and assigning a classification label to each individual section. In one embodiment, the pre-processor 210 labels each section of a known malicious file as malicious and labels each section of a known normal file as normal. In marked contrast to supervised training where an entire file is assigned a single classification label, the pre-processor 210 assigns a classification label to each individual section of a file.

Because the pre-processor 210 labels each section of a malicious file as malicious regardless of whether or not the section is malicious, some of the sections of the malicious file may end up being labeled incorrectly. That is, a normal section (i.e., section with no malicious code) of the malicious file will also be labeled as malicious. This is markedly different from previous approaches where samples in the training data set are labeled correctly and each label applies to an entire file, rather than individual sections of a file.

In the example of FIG. 2, the pre-processor 210 receives a normal file from the samples of known normal files, divides the normal file into a plurality of file sections 211 (i.e., 211-1, 211-2, . . . , 211-n) (see arrow 201), and labels each file section 211 as normal (L:NORM) (see arrow 202). The pre-processor 210 labels each file section 211 as normal regardless of whether or not the file section 211 is actually normal. Similarly, the pre-processor 210 receives a malicious file from the samples of known malicious files, divides the malicious file into a plurality of file sections 212 (i.e., 212-1, 212-2, . . . , 212-n) (see arrow 204), and labels each file section 212 as malicious (L:MAL) (see arrow 205). The pre-processor 210 labels each file section 212 as malicious regardless of whether or not the file section 212 is actually malicious. Each file section may be large enough to contain an identifiable portion of malicious code. The sizes of the file sections 211 and 212 are not necessarily the same because a machine learning module can adapt to different sizes or fill/pad a file section as needed. FIG. 3 shows an example file section extracted from a malicious PE file, and FIG. 4 shows an example file section extracted from a normal PE file.

Figure 5:
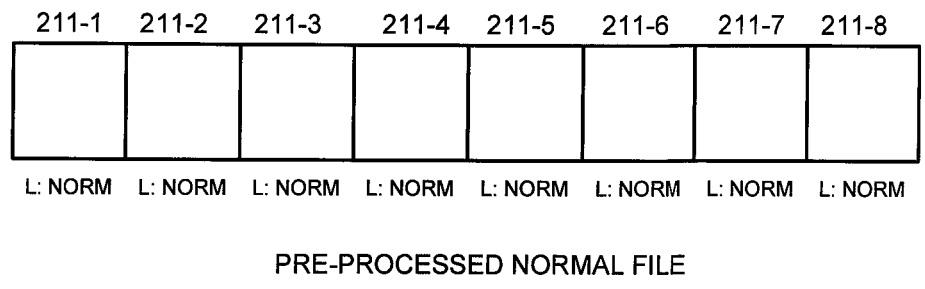
FIG. 5 shows a normal file prepared by a pre-processor in accordance with an embodiment of the present invention.

FIG. 5 shows a normal file prepared by the pre-processor 210 in accordance with an embodiment of the present invention. In the example of FIG. 5, the pre-processor 210 divided the normal file into a plurality of file sections 211 and labeled each file section 211 as normal (L:NORM). In the case of a normal file, each file section 211 will end up being labeled correctly, as the normal file is from the samples of known normal files.

Figure 6:
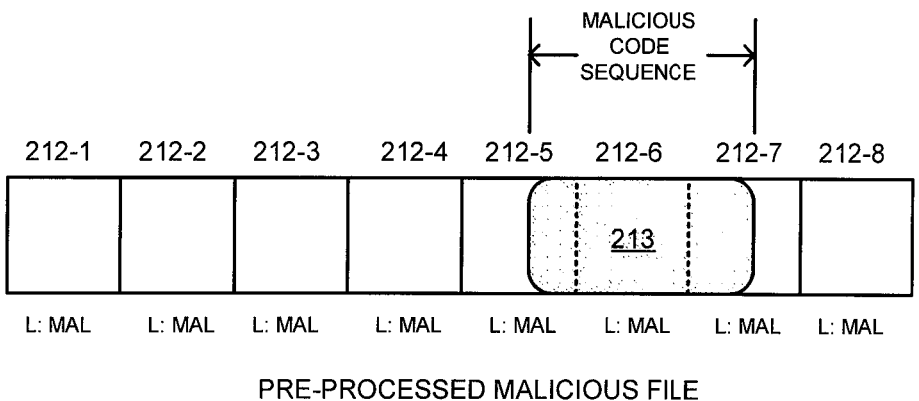
FIG. 6 shows a malicious file prepared by a pre-processor in accordance with an embodiment of the present invention.

FIG. 6 shows a malicious file prepared by the pre-processor 210 in accordance with an embodiment of the present invention. In the example of FIG. 6, the pre-processor 210 divided the malicious file into a plurality of file sections 212 and labeled each file section 212 as malicious (L:MAL). In the case of a malicious file, some file section 212 will end up being labeled incorrectly, as a malicious file does not necessarily consists of only malicious code. Still, the pre-processor 210 labels a section of a malicious file as malicious regardless of whether or not the section contains malicious code.

In the example of FIG. 6, the malicious file comprises consecutive file sections 212-1 to 212-8. A malicious code sequence 213 is present only in sections 212-5, 212-6, and 212-7. The file sections 212-5, 212-6, and 212-7 are thus correctly labeled as malicious. However, the file sections 212-1, 212-2, 212-3, 212-4, and 212-8 have no malicious code, i.e., normal. This results in the file sections 212-1, 212-2, 212-3, 212-4, and 212-8 being labeled incorrectly as malicious.

With sufficient number of samples of known normal and known malicious files, a suitable machine learning algorithm will be able to ignore incorrectly-labeled file sections as noise. This is especially true with executable files. For example, assuming that the normal file of FIG. 5 is a clean (i.e., normal; not infected) copy of a popular executable file and the malicious file of FIG. 6 is an infected (i.e., malicious) copy of the same popular executable file, the machine learning algorithm will detect that file sections 211-1, 211-2, 211-3, 211-4, and 211-8 of the normal file are labeled as normal but corresponding file sections of the malicious file with the same content, i.e., file sections 212-1, 212-2, 212-3, 212-4, and 212-8, are labeled as malicious. The machine learning algorithm will ignore incorrectly-labeled file sections 212 of malicious files and corresponding file sections 211 of normal files as noise, and learn to identify file sections 212 that actually contain malicious code.

More specifically, in the example of FIGS. 5 and 6, the machine learning algorithm will ignore the file sections 211-1, 211-2, 211-3, 211-4, and 211-8 of the normal file and file sections 212-1, 212-2, 212-3, 212-4, and 212-8 of the malicious file as noise, but will treat file sections 211-5, 211-6, and 211-7 of the normal file as normal file sections and will treat file sections 212-5, 212-6, and 212-7 of the malicious file as malicious file sections.

Referring back to FIG. 2, the machine learning module 220 may comprise instructions that implement a machine learning algorithm. The machine learning module 220 may employ any suitable machine learning algorithm, such as SVM or Random Forest, without detracting from the merits of the present invention. The machine learning module 220 receives file sections 211 of normal files (see arrow 203) and file sections 212 of malicious files (see arrow 206). The machine learning module 220 receives the file sections 211 and 212 as pre-processed training data set for generating a machine learning model 230. More specifically, the machine learning module 220 is trained using the labeled file sections 211 and 212. The trained machine learning module 220 is packaged as a machine learning model 230 for deployment.

As can be appreciated, by training the machine learning module 220 using the file sections 211 and 212, the resulting machine learning model 230 is able to detect malicious file sections and normal file sections. The machine learning model 230 may be deployed in a backend computer system to assist antivirus researchers in isolating malicious codes for research or signature development. The machine learning model 230 may also be deployed in an endpoint computer system to protect an endpoint computer system against malware as now described with reference to FIG. 7.

Figure 7:
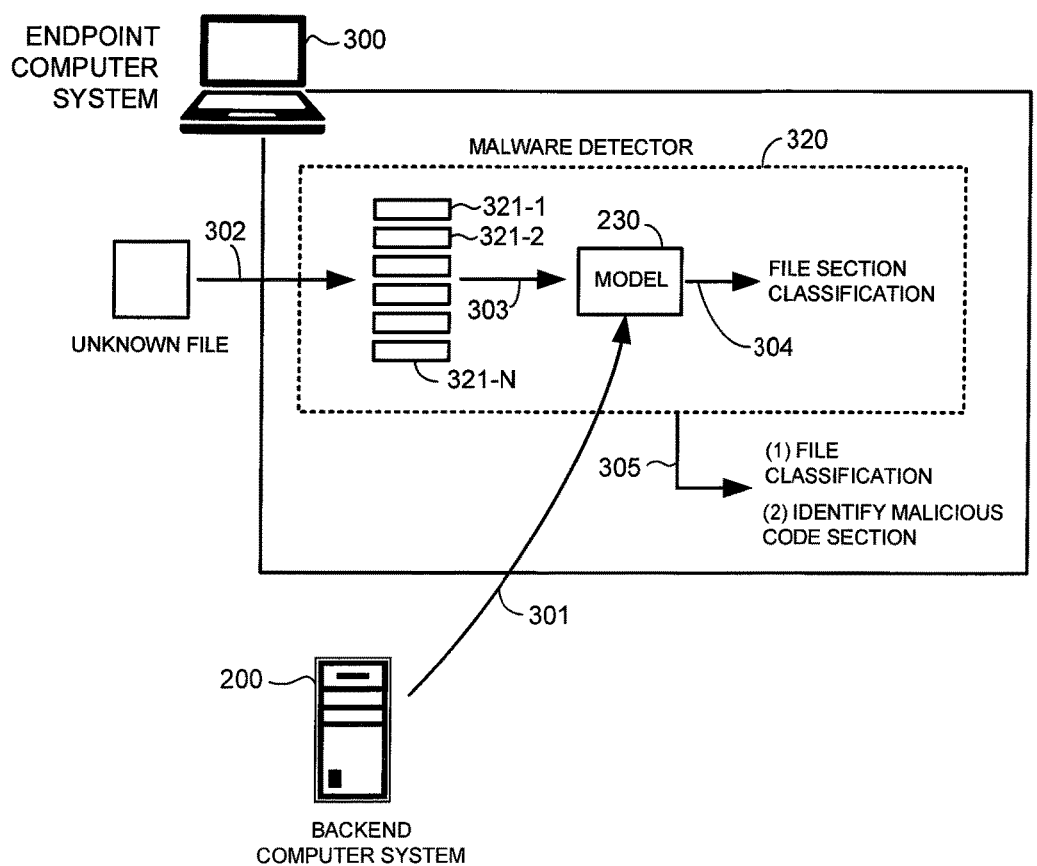
FIG. 7 shows a system for identifying malicious files in accordance with an embodiment of the present invention.

FIG. 7 shows a system for identifying malicious files in accordance with an embodiment of the present invention. In the example of FIG. 7, the system includes an endpoint computer system 300 and the backend computer system 200. As can be appreciated, the backend computer system 200 may work in conjunction with a plurality of endpoint computer systems 300, but only one is shown in FIG. 7 for clarity of illustration.

In the example of FIG. 7, the endpoint computer system 300 receives the machine learning model 230 from the backend computer system 200 (see arrow 301). Generally speaking, the backend computer system 200 may provide the machine learning model 230 to subscribing endpoint computer systems 300 over the Internet. The endpoint computer system 300 may include a malware detector 320.

The malware detector 320 may comprise one or more software modules for detecting malicious files. In one embodiment, the malware detector 320 includes the machine learning model 230.

In the example of FIG. 7, the endpoint computer system 300 receives an unknown file for evaluation. An unknown file is so named because the classification of the file is unknown, i.e., the file is not known to be malicious or normal. In one embodiment, the malware detector 320 classifies the unknown file and identifies particular portions of the file that contain malicious code, if any is present in the file. An unknown file being evaluated for malware is also referred to herein as a "target file."

More particularly, in the example of FIG. 7, the malware detector 320 divides a target file into a plurality of file sections 321 (i.e., 321-1, 321-2, ..., 321-n) (see arrow 302). The file sections 321 of the target file are input to the machine learning model 230 (see arrow 303), which classifies each of the file sections 321 as either normal or malicious (see arrow 304).

In one embodiment, the malware detector 320 deems the target file to be malicious when at least one file section 321 of the target file is classified by the machine learning model 230 as malicious. In that case, the malware detector 320 may identify the particular section of the target file that is classified by the machine learning model 230 as malicious. The malware detector 320 may deem the target file to be normal if none of the file sections 321 of the target file is classified by the machine learning model 230 as malicious. The malware detector 320 may take a response action against a detected malicious file, such as putting the malicious file in quarantine, blocking the malicious file from being received in the endpoint computer system 300, cleaning the malicious file, alerting a user or administrator, etc.

Advantageously, the malware detector 320 is able to determine whether or not a file is malicious and which section of a malicious file contains malicious code (see arrow 305). This allows for a more thorough evaluation of a target file for malicious codes. Furthermore, by identifying the particular sections of a target file that contain malicious code, the malicious code may be extracted from the target file to clean the target file or to aid antivirus researchers in developing a signature for detecting the malicious code.

Methods and system for detecting malicious code sections of computer files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of evaluating a file for malicious code, the method comprising:
   receiving a plurality of normal files and a plurality of malicious files;
   dividing each of the normal files and each of the malicious files into a plurality of file sections;
   labeling each file section of the normal files as a normal file section;
   labeling each file section of the malicious files as a malicious file section;
   generating a machine learning model using a machine learning training data set comprising the labeled file sections of the normal files and the malicious files; and
   using the machine learning model to identify which particular section of a target file contains malicious code.

2. The computer-implemented method of claim 1, wherein using the machine learning model to identify which particular section of the target fie contains malicious code comprises:
   dividing the target file into a plurality of sections; and
   using the machine learning model to classify each of the sections of the target file.

3. The computer-implemented method of claim 1, wherein the machine learning model is generated by training a Support Vector Machine using the training data set.

4. The computer-implemented method of claim 1, further comprising:
   providing the machine learning model to an endpoint computer system over a computer network,
   wherein the endpoint computer system receives the target file over the computer network and classifies individual sections of the target file using the machine learning model.

5. The computer-implemented method of claim 1, wherein the normal files, the malicious files, and the target file are executable files.

6. The computer-implemented method of claim 1, wherein the normal files, the malicious files, and the target file are in Portable Executable format.

7. A system for evaluating files for malicious code, the system comprising:
   a backend computer system that is configured to divide each of a plurality of normal files into file sections, divide each of a plurality of malicious files into file sections, label each file section of the normal files as a normal file section, label each file section of the malicious files as a malicious file section, and generate a machine learning model using a machine learning training data set comprising labeled file sections of the normal files and the malicious files; and
   an endpoint computer that is configured to receive the machine learning model over a computer network, receive a target file, and use the machine learning model to identify which particular section of the target file contains malicious code.

8. The system of claim 7, wherein the endpoint computer divides the target file into a plurality of sections and inputs the sections of the target file into the machine learning model.

9. The system of claim 7, wherein the backend computer system generates the machine learning model by training a Support Vector Machine using the training data set.

10. The system of claim 7, wherein the normal files, the malicious files, and the target file are executable files.

11. The system of claim 7, wherein the normal files, the malicious files, and the target file are in Portable Executable format.

12. The system of claim 7, wherein the endpoint computer divides the target file into a plurality of sections and inputs the sections of the target file into the machine learning model.

13. A non-transitory computer-readable medium comprising instructions stored thereon, that when executed by a processor, perform the steps of:
   dividing each of a plurality of normal files and each of a plurality of malicious files into a plurality of file sections;
   labeling each file section of the normal files as a normal file section;
   labeling each file section of the malicious files as a malicious file section;

generating a machine learning model using a machine learning training data set comprising labeled file sections of the normal files and the malicious files; and providing the machine learning model to an endpoint computer system to detect malicious files in the endpoint computer system.

14. The non-transitory computer-readable medium of claim 13, wherein the machine learning model is generated by training a Support Vector Machine using the training data set.

15. The non-transitory computer-readable medium of claim 13, wherein the normal files and the malicious files are executable files.

16. The non-transitory computer-readable medium of claim 13, wherein the normal files and the malicious files are in Portable Executable format.

17. The non-transitory computer-readable medium of claim 13, wherein the machine learning model is provided to the endpoint computer system over the Internet.

* * * * *